US008692838B2

(12) United States Patent

Wiley et al.

(10) Patent No.: US 8,692,838 B2
(45) Date of Patent: Apr. 8, 2014

(54) METHODS AND SYSTEMS FOR UPDATING A BUFFER

(75) Inventors: George Alan Wiley, San Diego, CA (US); Brian Steele, Lafayette, CO (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/285,399

(22) Filed: Nov. 23, 2005

(65) Prior Publication Data

US 2006/0164424 A1 Jul. 27, 2006

Related U.S. Application Data

(60) Provisional application No. 60/630,853, filed on Nov. 24, 2004, provisional application No. 60/631,549, filed on Nov. 30, 2004, provisional application No. 60/632,825, filed on Dec. 2, 2004, provisional application No. 60/633,071, filed on Dec. 2, 2004, provisional application No. 60/633,084, filed on Dec. 2, 2004, provisional application No. 60/632,852, filed on Dec. 2, 2004.

(51) Int. Cl.
*G06T 15/00* (2011.01)

(52) U.S. Cl.
USPC ........... 345/539; 345/501; 345/530; 370/216; 370/242; 370/389; 455/450; 455/572

(58) Field of Classification Search
USPC .......... 345/530, 539, 501; 370/216, 242, 389, 370/397, 399, 409; 707/3, 101; 455/450, 455/572
See application file for complete search history.

(56) References Cited

U.S. PATENT DOCUMENTS

| | | | |
|---|---|---|---|
| 3,594,304 | A | 7/1971 | Seitzer et al. |
| 4,042,783 | A | 8/1977 | Gindi |
| 4,363,123 | A | 12/1982 | Grover |
| 4,393,444 | A | 7/1983 | Weinberg |

(Continued)

FOREIGN PATENT DOCUMENTS

| | | | |
|---|---|---|---|
| CN | 88101302 | A | 10/1988 |
| CN | 1234709 | A | 11/1999 |

(Continued)

OTHER PUBLICATIONS

Video Electronics Standards Association (VESA), "Mobile Display Digital Interface Standard (MDDI)", Jul. 2004.

(Continued)

*Primary Examiner* — Phu K Nguyen
(74) *Attorney, Agent, or Firm* — Nicholas J. Pauley; Peter Michael Kamarchik; Joseph Agusta

(57) ABSTRACT

The present invention relates to methods and systems for updating a buffer. In one aspect, the present invention provides a method for updating a buffer, which includes strategically writing to the buffer to enable concurrent read and write to the buffer. The method eliminates the need for double buffering, thereby resulting in implementation cost and space savings compared to conventional buffering approaches. The method also prevents image tearing when used to update a frame buffer associated with a display, but is not limited to such applications. In another aspect, the present invention provides efficient mechanisms to enable buffer update across a communication link. In one example, the present invention provides a method for relaying timing information across a communication link.

24 Claims, 9 Drawing Sheets

(56) References Cited

U.S. PATENT DOCUMENTS 4,491,943 A 1/1985 Iga et al.
4,660,096 A 4/1987 Arlan et al.
4,764,805 A 8/1988 Rabbani et al.
4,769,761 A 9/1988 Downes et al.
4,812,296 A 3/1989 Schmelz et al.
4,821,296 A 4/1989 Cordell
4,891,805 A 1/1990 Fallin
5,079,693 A * 1/1992 Miller .......................... 711/156
5,111,455 A 5/1992 Negus
5,131,012 A 7/1992 Dravida
5,138,616 A 8/1992 Wagner, Jr. et al.
5,155,590 A 10/1992 Beyers, II et al.
5,167,035 A 11/1992 Mann et al.
5,224,213 A * 6/1993 Dieffenderfer et al. ......... 710/53
5,227,783 A 7/1993 Shaw et al.
5,231,636 A 7/1993 Rasmussen
5,331,642 A 7/1994 Valley et al.
5,345,542 A 9/1994 Wye
5,359,595 A 10/1994 Weddle et al.
5,377,188 A 12/1994 Seki
5,396,636 A 3/1995 Gallagher et al.
5,418,452 A 5/1995 Pyle .......................... 324/158.1
5,418,952 A 5/1995 Morley et al.
5,420,858 A 5/1995 Marshall et al.
5,422,894 A 6/1995 Abe et al.
5,430,486 A 7/1995 Fraser et al.
5,477,534 A 12/1995 Kusano
5,483,185 A 1/1996 Scriber et al.
5,490,247 A 2/1996 Tung et al. .................... 345/501
5,502,499 A 3/1996 Birch et al.
5,510,832 A 4/1996 Garcia
5,513,185 A 4/1996 Schmidt
5,519,830 A 5/1996 Opoczynski
5,521,907 A 5/1996 Ennis, Jr. et al.
5,575,951 A 5/1996 Anderson
5,524,007 A 6/1996 White et al.
5,530,704 A 6/1996 Gibbons et al.
5,535,336 A 7/1996 Smith et al.
5,543,939 A 8/1996 Harvey et al.
5,546,121 A 8/1996 Gotanda et al.
5,550,489 A 8/1996 Raab et al.
5,559,459 A 9/1996 Back et al.
5,559,952 A * 9/1996 Fujimoto ...................... 345/557
5,560,022 A 9/1996 Dunstan et al.
5,565,957 A 10/1996 Goto
5,604,450 A 2/1997 Borkar et al.
5,619,650 A 4/1997 Bach et al.
5,621,664 A 4/1997 Phaal
5,646,947 A 7/1997 Cooper et al.
5,664,948 A 9/1997 Dimitriadis et al.
5,680,404 A 10/1997 Gray
5,726,990 A 3/1998 Shimada et al.
5,732,352 A 3/1998 Gutowski et al.
5,733,131 A 3/1998 Park
5,734,118 A 3/1998 Ashour et al.
5,751,445 A 5/1998 Masunaga
5,751,951 A 5/1998 Osborne et al.
5,777,999 A 7/1998 Hiraki et al.
5,790,551 A 8/1998 Chan
5,798,720 A 8/1998 Yano et al.
5,802,351 A 9/1998 Frampton
5,815,507 A 9/1998 Vinggaard et al.
5,816,921 A 10/1998 Hosokawa
5,818,255 A 10/1998 New et al.
5,822,603 A 10/1998 Hansen et al.
5,844,918 A 12/1998 Kato
5,847,752 A 12/1998 Sebestyen
5,862,160 A 1/1999 Irvin et al.
5,864,546 A 1/1999 Campanella
5,867,501 A * 2/1999 Horst et al. ................... 370/474
5,867,510 A 2/1999 Steele
5,881,262 A 3/1999 Abramson et al.
5,903,281 A * 5/1999 Chen et al. .................... 345/504
5,935,256 A 8/1999 Lesmeister
5,953,378 A 9/1999 Hotani et al.
5,958,006 A 9/1999 Eggleston et al.
5,963,557 A 10/1999 Eng
5,963,564 A 10/1999 Petersen et al.
5,963,979 A 10/1999 Inoue et al.
5,969,750 A 10/1999 Hsieh et al.
5,982,362 A 11/1999 Crater et al.
5,983,261 A 11/1999 Riddle
5,990,852 A 11/1999 Szamrej
5,990,902 A 11/1999 Park
5,995,512 A 11/1999 Pogue, Jr.
6,002,709 A 12/1999 Hendrickson
6,014,705 A 1/2000 Koenck et al.
6,047,380 A 4/2000 Nolan et al.
6,049,837 A 4/2000 Youngman
6,055,247 A 4/2000 Kubota et al.
6,064,649 A 5/2000 Johnston ...................... 370/280
6,078,361 A 6/2000 Reddy
6,081,513 A 6/2000 Roy
6,091,709 A 7/2000 Harrison et al.
6,092,231 A 7/2000 Sze
6,097,401 A 8/2000 Owen et al.
6,101,601 A 8/2000 Matthews et al.
6,118,791 A 9/2000 Fichou et al.
6,151,067 A 11/2000 Suemoto et al.
6,151,320 A 11/2000 Shim et al.
6,154,156 A 11/2000 Tagato ............................ 341/79
6,154,466 A 11/2000 Iwasaki et al.
6,185,601 B1 2/2001 Wolff
6,192,230 B1 2/2001 Van Bokhorst et al.
6,198,752 B1 3/2001 Lee
6,199,169 B1 3/2001 Voth et al.
6,222,677 B1 4/2001 Budd et al. .................... 359/630
6,236,647 B1 5/2001 Amalfitano
6,242,953 B1 6/2001 Thomas
6,243,596 B1 6/2001 Kikinis ......................... 455/572
6,243,761 B1 6/2001 Mogul et al.
6,246,876 B1 6/2001 Hontzeas
6,252,526 B1 6/2001 Uyehara
6,252,888 B1 6/2001 Fite, Jr. et al.
6,256,509 B1 7/2001 Tanaka et al.
6,288,739 B1 9/2001 Hales et al.
6,297,684 B1 10/2001 Uyehara et al.
6,308,239 B1 10/2001 Osakada et al.
6,335,696 B1 1/2002 Aoyagi et al.
6,359,479 B1 3/2002 Oprescu
6,363,439 B1 3/2002 Battles et al.
6,393,008 B1 5/2002 Cheng et al.
6,397,286 B1 5/2002 Chatenever et al. .......... 710/302
6,400,392 B1 6/2002 Yamaguchi et al.
6,400,654 B1 6/2002 Sawamura et al.
6,400,754 B2 6/2002 Fleming et al.
6,421,735 B1 7/2002 Jung et al.
6,429,867 B1 8/2002 Deering
6,430,196 B1 8/2002 Baroudi
6,430,606 B1 8/2002 Haq
6,434,187 B1 8/2002 Beard et al.
6,438,363 B1 8/2002 Feder et al.
6,457,090 B1 9/2002 Young
6,475,245 B2 11/2002 Gersho et al.
6,477,186 B1 11/2002 Nakura et al.
6,480,521 B1 11/2002 Odenwalder et al.
6,483,825 B2 11/2002 Seta
6,487,217 B1 11/2002 Baroudi
6,493,357 B1 12/2002 Fujisaki
6,493,713 B1 12/2002 Kanno
6,493,824 B1 12/2002 Novoa et al.
6,545,979 B1 4/2003 Poulin
6,549,538 B1 4/2003 Beck et al.
6,549,958 B1 4/2003 Kuba
6,574,211 B2 6/2003 Padovani et al.
6,583,809 B1 6/2003 Fujiwara
6,594,304 B2 7/2003 Chan ............................ 208/431
6,609,167 B1 8/2003 Bastiani et al.
6,611,221 B1 8/2003 Soundarapandian et al.
6,611,503 B1 8/2003 Fitzgerald et al.
6,618,360 B1 9/2003 Scoville et al.
6,621,809 B1 9/2003 Lee et al.
6,621,851 B1 9/2003 Agee et al.
6,636,508 B1 10/2003 Li et al.

(56) References Cited

U.S. PATENT DOCUMENTS 6,636,922 B1 10/2003 Bastiani et al.
6,662,322 B1 12/2003 Abdelilah et al.
6,690,201 B1 2/2004 Simkins et al.
6,714,233 B2 3/2004 Chihara et al.
6,715,088 B1 3/2004 Togawa
6,728,263 B2 4/2004 Joy et al.
6,738,344 B1 * 5/2004 Bunton et al. ................ 370/216
6,745,364 B2 6/2004 Bhatt et al.
6,754,179 B1 6/2004 Lin
6,760,722 B1 7/2004 Raghunandan ................... 707/3
6,760,772 B2 * 7/2004 Zou et al. ...................... 709/203
6,760,882 B1 7/2004 Gesbert et al.
6,765,506 B1 7/2004 Lu
6,771,613 B1 8/2004 O'Toole et al.
6,778,493 B1 8/2004 Ishii
6,782,039 B2 8/2004 Alamouti et al.
6,784,941 B1 8/2004 Su et al.
6,791,379 B1 9/2004 Wakayama et al.
6,797,891 B1 9/2004 Blair et al.
6,804,257 B1 10/2004 Benayoun et al.
6,810,084 B1 10/2004 Jun et al.
6,813,638 B1 11/2004 Sevanto et al.
6,816,929 B2 11/2004 Ueda
6,831,685 B1 12/2004 Ueno et al.
6,836,469 B1 12/2004 Wu
6,850,282 B1 2/2005 Makino et al.
6,865,240 B1 3/2005 Kawataka
6,865,609 B1 3/2005 Gubbi et al.
6,865,610 B2 3/2005 Bolosky et al.
6,867,668 B1 3/2005 Dagostino et al.
6,882,361 B1 4/2005 Gaylord
6,886,035 B2 4/2005 Wolff
6,892,071 B2 5/2005 Park et al.
6,894,994 B1 5/2005 Grob et al.
6,895,410 B2 * 5/2005 Ridge ........................ 707/104.1
6,897,891 B2 5/2005 Itsukaichi
6,906,762 B1 6/2005 Witehira
6,927,746 B2 8/2005 Lee et al.
6,944,136 B2 9/2005 Kim et al.
6,947,436 B2 9/2005 Harris et al.
6,950,428 B1 * 9/2005 Horst et al. ................... 370/389
6,956,829 B2 10/2005 Lee
6,973,039 B2 12/2005 Redi et al.
6,973,062 B1 12/2005 Han
6,975,145 B1 12/2005 Vadi et al.
6,990,549 B2 1/2006 Main et al.
6,993,393 B2 1/2006 Von Arx et al.
6,999,432 B2 2/2006 Zhang et al.
7,003,796 B1 2/2006 Humpleman
7,010,607 B1 3/2006 Bunton
7,012,636 B2 3/2006 Hatanaka
7,015,838 B1 3/2006 Groen et al.
7,023,924 B1 4/2006 Keller et al.
7,030,796 B2 4/2006 Shim et al.
7,036,066 B2 4/2006 Weibel et al.
7,042,914 B2 5/2006 Zerbe et al.
7,047,475 B2 5/2006 Sharma et al.
7,051,218 B1 5/2006 Gulick et al.
7,062,264 B2 6/2006 Ko et al.
7,062,579 B2 6/2006 Tateyama et al.
7,068,666 B2 * 6/2006 Foster et al. .................. 370/397
7,095,435 B1 8/2006 Hartman et al.
7,110,420 B2 9/2006 Bashirullah et al.
7,126,945 B2 10/2006 Beach
7,138,989 B2 11/2006 Mendelson et al.
7,143,177 B1 11/2006 Johnson et al.
7,143,207 B2 11/2006 Vogt et al.
7,145,411 B1 12/2006 Blair et al.
7,151,940 B2 12/2006 Diao
7,158,536 B2 1/2007 Ching et al.
7,158,539 B2 1/2007 Zhang et al.
7,161,846 B2 1/2007 Padaparambil
7,165,112 B2 1/2007 Battin et al.
7,178,042 B2 2/2007 Sakagami
7,180,951 B2 2/2007 Chan
7,184,408 B2 2/2007 Denton et al.
7,187,738 B2 3/2007 Naven et al.
7,191,281 B2 3/2007 Bajikar
7,219,294 B2 5/2007 Vogt et al.
7,231,402 B2 6/2007 Dickens
7,251,231 B2 7/2007 Gubbi
7,257,087 B2 8/2007 Grovenburg
7,260,087 B2 8/2007 Bao et al.
7,269,153 B1 9/2007 Schultz et al.
7,274,652 B1 9/2007 Webster et al.
7,278,069 B2 10/2007 Abrosimov et al.
7,284,181 B1 10/2007 Venkatramani
7,301,968 B2 11/2007 Haran et al.
7,310,535 B1 12/2007 MacKenzie et al.
7,315,265 B2 1/2008 Wiley et al.
7,315,520 B2 1/2008 Xue et al.
7,317,754 B1 1/2008 Remy et al.
7,327,735 B2 2/2008 Robotham et al.
7,336,139 B2 2/2008 Blair et al.
7,336,667 B2 2/2008 Allen et al.
7,340,548 B2 3/2008 Love et al.
7,349,973 B2 3/2008 Saito et al.
7,373,155 B2 5/2008 Duan et al.
7,383,350 B1 6/2008 Moore et al.
7,383,399 B2 6/2008 Vogt et al.
7,392,541 B2 6/2008 Largman et al.
7,403,487 B1 7/2008 Foladare et al.
7,403,511 B2 7/2008 Liang et al.
7,405,703 B2 7/2008 Qi et al.
7,412,642 B2 8/2008 Cypher
7,430,001 B2 9/2008 Fujii
7,447,953 B2 11/2008 Vogt et al.
7,451,362 B2 11/2008 Chen et al.
7,487,917 B2 2/2009 Kotlarsky et al.
7,508,760 B2 3/2009 Akiyama et al.
7,515,705 B2 4/2009 Segawa et al.
7,526,323 B2 4/2009 Kim et al.
7,536,598 B2 5/2009 Largman et al.
7,543,326 B2 6/2009 Moni
7,557,633 B2 7/2009 Yu
7,574,113 B2 8/2009 Nagahara et al.
7,595,834 B2 9/2009 Kawai et al.
7,595,835 B2 9/2009 Kosaka et al.
7,634,607 B2 12/2009 Honda
7,643,823 B2 1/2010 Shamoon et al.
7,729,720 B2 6/2010 Suh et al.
7,800,600 B2 9/2010 Komatsu et al.
7,813,451 B2 10/2010 Binder et al.
7,831,127 B2 11/2010 Wilkinson
7,835,280 B2 11/2010 Pang et al.
7,844,296 B2 11/2010 Yuki
7,873,343 B2 1/2011 Gollnick et al.
7,876,821 B2 1/2011 Li et al.
7,877,439 B2 1/2011 Gallou et al.
7,912,503 B2 3/2011 Chang et al.
7,945,143 B2 5/2011 Yahata et al.
7,949,777 B2 5/2011 Wallace et al.
8,031,130 B2 10/2011 Tamura
8,077,634 B2 12/2011 Maggenti et al.
8,325,239 B2 12/2012 Kaplan et al.
2001/0005385 A1 6/2001 Ichiguchi et al.
2001/0012293 A1 8/2001 Petersen et al.
2001/0032295 A1 10/2001 Tsai et al.
2001/0047450 A1 11/2001 Gillingham et al.
2001/0047475 A1 11/2001 Terasaki
2001/0053174 A1 12/2001 Fleming et al.
2002/0011998 A1 1/2002 Tamura
2002/0045448 A1 4/2002 Park et al.
2002/0067787 A1 6/2002 Naven et al.
2002/0071395 A1 6/2002 Redi et al.
2002/0131379 A1 9/2002 Lee et al.
2002/0140845 A1 10/2002 Yoshida et al.
2002/0146024 A1 10/2002 Harris et al.
2002/0188907 A1 12/2002 Kobayashi
2002/0193133 A1 12/2002 Shibutani
2003/0003943 A1 1/2003 Bajikar
2003/0028647 A1 2/2003 Grosu
2003/0033417 A1 2/2003 Wiley et al.
2003/0034955 A1 2/2003 Gilder et al.

(56) References Cited

U.S. PATENT DOCUMENTS

| | | | | |
|---|---|---|---|---|
| 2003/0035049 | A1 | 2/2003 | Dickens et al. | |
| 2003/0039212 | A1 | 2/2003 | Lloyd et al. | |
| 2003/0061431 | A1 | 3/2003 | Mears et al. | |
| 2003/0081557 | A1 | 5/2003 | Mettala et al. | |
| 2003/0086443 | A1 | 5/2003 | Beach et al. | |
| 2003/0091056 | A1 | 5/2003 | Walker et al. | |
| 2003/0093607 | A1 | 5/2003 | Main et al. | |
| 2003/0125040 | A1 | 7/2003 | Walton et al. | |
| 2003/0144006 | A1 | 7/2003 | Johansson et al. | |
| 2003/0158979 | A1 | 8/2003 | Tateyama et al. | |
| 2003/0185220 | A1 | 10/2003 | Valenci | |
| 2003/0191809 | A1 | 10/2003 | Mosley et al. | |
| 2003/0194018 | A1 | 10/2003 | Chang | |
| 2003/0235209 | A1 | 12/2003 | Garg et al. | |
| 2004/0008631 | A1 | 1/2004 | Kim | |
| 2004/0024920 | A1 | 2/2004 | Gulick et al. | |
| 2004/0028415 | A1 | 2/2004 | Eiselt | |
| 2004/0049616 | A1 | 3/2004 | Dunstan et al. | |
| 2004/0073697 | A1* | 4/2004 | Saito et al. | 709/233 |
| 2004/0082383 | A1 | 4/2004 | Muncaster et al. | |
| 2004/0100966 | A1 | 5/2004 | Allen, Jr. et al. | |
| 2004/0128563 | A1 | 7/2004 | Kaushik et al. | |
| 2004/0130466 | A1 | 7/2004 | Lu et al. | |
| 2004/0140459 | A1 | 7/2004 | Haigh et al. | 252/501.1 |
| 2004/0153952 | A1 | 8/2004 | Sharma et al. | |
| 2004/0176065 | A1 | 9/2004 | Liu | |
| 2004/0184450 | A1 | 9/2004 | Omran | |
| 2004/0199652 | A1 | 10/2004 | Zou et al. | |
| 2004/0221315 | A1 | 11/2004 | Kobayashi | |
| 2004/0260823 | A1 | 12/2004 | Tiwari et al. | |
| 2005/0012905 | A1 | 1/2005 | Morinaga | |
| 2005/0020279 | A1 | 1/2005 | Markhovsky et al. | |
| 2005/0021885 | A1 | 1/2005 | Anderson et al. | |
| 2005/0033586 | A1 | 2/2005 | Savell | |
| 2005/0055399 | A1 | 3/2005 | Savchuk | |
| 2005/0088939 | A1 | 4/2005 | Hwang et al. | |
| 2005/0091593 | A1 | 4/2005 | Peltz | |
| 2005/0108611 | A1 | 5/2005 | Vogt et al. | |
| 2005/0117601 | A1 | 6/2005 | Anderson et al. | |
| 2005/0120079 | A1 | 6/2005 | Anderson et al. | |
| 2005/0120208 | A1 | 6/2005 | Dobson et al. | |
| 2005/0125840 | A1 | 6/2005 | Anderson et al. | |
| 2005/0135390 | A1 | 6/2005 | Anderson et al. | |
| 2005/0138260 | A1 | 6/2005 | Love et al. | |
| 2005/0144225 | A1 | 6/2005 | Anderson et al. | |
| 2005/0154599 | A1 | 7/2005 | Kopra et al. | |
| 2005/0163085 | A1 | 7/2005 | Cromer et al. | |
| 2005/0163116 | A1 | 7/2005 | Anderson et al. | |
| 2005/0165970 | A1* | 7/2005 | Ching et al. | 710/1 |
| 2005/0184993 | A1 | 8/2005 | Ludwin et al. | |
| 2005/0204057 | A1 | 9/2005 | Anderson et al. | |
| 2005/0213593 | A1 | 9/2005 | Anderson et al. | |
| 2005/0216421 | A1* | 9/2005 | Barry et al. | 705/64 |
| 2005/0216599 | A1 | 9/2005 | Anderson et al. | |
| 2005/0216623 | A1 | 9/2005 | Dietrich et al. | |
| 2005/0248685 | A1* | 11/2005 | Seo et al. | 348/376 |
| 2005/0259670 | A1 | 11/2005 | Anderson et al. | |
| 2005/0265333 | A1 | 12/2005 | Coffey et al. | |
| 2005/0271072 | A1 | 12/2005 | Anderson et al. | |
| 2005/0286466 | A1 | 12/2005 | Tagg et al. | |
| 2006/0004968 | A1 | 1/2006 | Vogt et al. | |
| 2006/0034301 | A1 | 2/2006 | Anderson et al. | |
| 2006/0034326 | A1 | 2/2006 | Anderson et al. | |
| 2006/0120433 | A1 | 6/2006 | Baker et al. | |
| 2006/0128399 | A1 | 6/2006 | Duan et al. | |
| 2006/0161691 | A1 | 7/2006 | Katibian et al. | |
| 2006/0168496 | A1 | 7/2006 | Steele et al. | |
| 2006/0171414 | A1 | 8/2006 | Katibian et al. | |
| 2006/0179164 | A1 | 8/2006 | Katibian et al. | |
| 2006/0179384 | A1 | 8/2006 | Wiley et al. | |
| 2006/0212775 | A1 | 9/2006 | Cypher et al. | |
| 2006/0274031 | A1 | 12/2006 | Yuen et al. | |
| 2006/0288133 | A1 | 12/2006 | Katibian et al. | |
| 2007/0008897 | A1 | 1/2007 | Denton et al. | |
| 2007/0073949 | A1 | 3/2007 | Fredrickson et al. | |
| 2007/0098002 | A1 | 5/2007 | Liu et al. | |
| 2007/0274434 | A1 | 11/2007 | Arkas et al. | |
| 2008/0036631 | A1 | 2/2008 | Musfeldt | |
| 2008/0088492 | A1 | 4/2008 | Wiley et al. | |
| 2008/0129749 | A1 | 6/2008 | Wiley et al. | |
| 2008/0147951 | A1 | 6/2008 | Love | |
| 2008/0282296 | A1 | 11/2008 | Kawai et al. | |
| 2009/0055709 | A1 | 2/2009 | Anderson et al. | |
| 2009/0070479 | A1 | 3/2009 | Anderson et al. | |
| 2009/0290628 | A1 | 11/2009 | Matsumoto | |
| 2010/0128626 | A1 | 5/2010 | Anderson et al. | |
| 2010/0260055 | A1 | 10/2010 | Anderson et al. | |
| 2011/0013681 | A1 | 1/2011 | Zou et al. | |
| 2011/0022719 | A1 | 1/2011 | Anderson et al. | |
| 2011/0199383 | A1 | 8/2011 | Anderson et al. | |
| 2011/0199931 | A1 | 8/2011 | Anderson et al. | |
| 2012/0008642 | A1 | 1/2012 | Katibian et al. | |

FOREIGN PATENT DOCUMENTS

| | | | |
|---|---|---|---|
| CN | 1310400 | A | 8/2001 |
| CN | 1377194 | A | 10/2002 |
| CN | 1467953 | A | 1/2004 |
| CN | 1476268 | A | 2/2004 |
| EP | 0594006 | A1 | 4/1994 |
| EP | 0872085 | | 12/1996 |
| EP | 0850522 | A2 | 7/1998 |
| EP | 0896318 | | 2/1999 |
| EP | 0969676 | | 1/2000 |
| EP | 1217602 | A2 | 6/2002 |
| EP | 1309151 | | 5/2003 |
| EP | 1423778 | A2 | 6/2004 |
| EP | 1478137 | A1 | 11/2004 |
| EP | 1544743 | A2 | 6/2005 |
| EP | 1580964 | A1 | 9/2005 |
| EP | 1630784 | | 3/2006 |
| FR | 2729528 | A1 | 7/1996 |
| GB | 2250668 | A | 6/1992 |
| GB | 2265796 | A | 10/1993 |
| JP | 53131709 | A | 11/1978 |
| JP | 62132433 | A | 6/1987 |
| JP | 64008731 | U | 1/1989 |
| JP | H01129371 | A | 5/1989 |
| JP | 1314022 | A | 12/1989 |
| JP | H0465711 | A | 3/1992 |
| JP | 4167715 | A | 6/1992 |
| JP | 4241541 | | 8/1992 |
| JP | 5199387 | A | 8/1993 |
| JP | 5219141 | A | 8/1993 |
| JP | 5260115 | A | 10/1993 |
| JP | 6037848 | A | 2/1994 |
| JP | 06053973 | | 2/1994 |
| JP | 06317829 | | 11/1994 |
| JP | 7115352 | A | 5/1995 |
| JP | 8037490 | | 2/1996 |
| JP | H0854481 | A | 2/1996 |
| JP | 08-274799 | | 10/1996 |
| JP | 09-006725 | | 1/1997 |
| JP | H0923243 | A | 1/1997 |
| JP | 09230837 | A | 9/1997 |
| JP | 09261232 | | 10/1997 |
| JP | 09270951 | | 10/1997 |
| JP | 9307457 | A | 11/1997 |
| JP | 10200941 | | 7/1998 |
| JP | 10234038 | A | 9/1998 |
| JP | 10312370 | A | 11/1998 |
| JP | 11017710 | | 1/1999 |
| JP | 11032041 | | 2/1999 |
| JP | 11032041 | A | 2/1999 |
| JP | 11122234 | A | 4/1999 |
| JP | 11163690 | A | 6/1999 |
| JP | 11225182 | A | 8/1999 |
| JP | 11225372 | A | 8/1999 |
| JP | 11249987 | | 9/1999 |
| JP | 11282786 | A | 10/1999 |
| JP | 11341363 | A | 12/1999 |
| JP | 11355327 | A | 12/1999 |
| JP | 2000188626 | | 7/2000 |
| JP | 200216843 | A | 8/2000 |

(56) References Cited

FOREIGN PATENT DOCUMENTS

| | | | |
|---|---|---|---|
| JP | 2000236260 | | 8/2000 |
| JP | 2000278141 | A | 10/2000 |
| JP | 2000295667 | | 10/2000 |
| JP | 2000324135 | A | 11/2000 |
| JP | 2000358033 | A | 12/2000 |
| JP | 200144960 | | 2/2001 |
| JP | 200194542 | | 4/2001 |
| JP | 2001094524 | | 4/2001 |
| JP | 2001177746 | | 6/2001 |
| JP | 2001222474 | A | 8/2001 |
| JP | 2001282714 | A | 10/2001 |
| JP | 2001292146 | A | 10/2001 |
| JP | 2001306428 | | 11/2001 |
| JP | 2001319745 | A | 11/2001 |
| JP | 2001320280 | | 11/2001 |
| JP | 2001333130 | A | 11/2001 |
| JP | 2002500855 | A | 1/2002 |
| JP | 2002503065 | T | 1/2002 |
| JP | 2002062990 | A | 2/2002 |
| JP | 2002208844 | A | 7/2002 |
| JP | 2002281007 | A | 9/2002 |
| JP | 2002300229 | A | 10/2002 |
| JP | 2002300299 | A | 10/2002 |
| JP | 2003006143 | A | 1/2003 |
| JP | 2003009035 | A | 1/2003 |
| JP | 2003044184 | A | 2/2003 |
| JP | 2003046595 | | 2/2003 |
| JP | 2003046596 | A | 2/2003 |
| JP | 2003058271 | A | 2/2003 |
| JP | 2003069544 | A | 3/2003 |
| JP | 2003076654 | A | 3/2003 |
| JP | 2003098583 | A | 4/2003 |
| JP | 2003111135 | A | 4/2003 |
| JP | 2003167680 | | 6/2003 |
| JP | 2003198550 | A | 7/2003 |
| JP | 2003303068 | A | 10/2003 |
| JP | 1467953 | A | 1/2004 |
| JP | 2004005683 | A | 1/2004 |
| JP | 2004007356 | A | 1/2004 |
| JP | 2004021613 | | 1/2004 |
| JP | 2004046324 | A | 2/2004 |
| JP | 2004153620 | | 5/2004 |
| JP | 2004246023 | A | 9/2004 |
| JP | 2004297660 | A | 10/2004 |
| JP | 2004531916 | T | 10/2004 |
| JP | 2004309623 | A | 11/2004 |
| JP | 2004363687 | A | 12/2004 |
| JP | 2005107683 | A | 4/2005 |
| JP | 2005536167 | A | 11/2005 |
| JP | 2005539464 | A | 12/2005 |
| KR | 1999-36310 | | 5/1999 |
| KR | 0222225 | | 10/1999 |
| KR | 1019990082741 | | 11/1999 |
| KR | 199961245 | | 7/2000 |
| KR | 200039224 | | 7/2000 |
| KR | 1999-0058829 | | 1/2001 |
| KR | 1020060056989 | | 1/2001 |
| KR | 20010019734 | | 3/2001 |
| KR | 20020071226 | | 9/2002 |
| KR | 2003-0061001 | | 7/2003 |
| KR | 20040014406 | | 2/2004 |
| KR | 2004-69360 | | 8/2004 |
| KR | 1020047003852 | | 5/2006 |
| KR | 1020060053050 | | 5/2006 |
| KR | 2004-0014406 | | 2/2007 |
| RU | 2111619 | | 5/1998 |
| RU | 2150791 | | 6/2000 |
| RU | 2337497 | | 10/2008 |
| RU | 2337497 | C2 | 10/2008 |
| TW | 459184 | B | 10/2001 |
| TW | 466410 | | 12/2001 |
| TW | 488133 | B | 5/2002 |
| TW | 507195 | | 10/2002 |
| TW | 513636 | | 12/2002 |
| TW | 515154 | | 12/2002 |
| TW | 529253 | | 4/2003 |
| TW | 535372 | | 6/2003 |
| TW | 540238 | B | 7/2003 |
| TW | 542979 | B | 7/2003 |
| TW | 200302008 | | 7/2003 |
| TW | 546958 | | 8/2003 |
| TW | 552792 | B | 9/2003 |
| TW | 200304313 | | 9/2003 |
| TW | 563305 | B | 11/2003 |
| TW | 569547 | B | 1/2004 |
| TW | 595116 | B | 6/2004 |
| WO | 9210890 | | 6/1992 |
| WO | 9410779 | | 5/1994 |
| WO | 9619053 | | 6/1996 |
| WO | 96/42158 | A1 | 12/1996 |
| WO | 1996/42158 | A1 | 12/1996 |
| WO | 98/02988 | A2 | 1/1998 |
| WO | 1998/02988 | A2 | 1/1998 |
| WO | WO9915979 | | 4/1999 |
| WO | 9923783 | A2 | 5/1999 |
| WO | 0130038 | | 4/2001 |
| WO | WO0137484 | A2 | 5/2001 |
| WO | WO0138970 | A2 | 5/2001 |
| WO | WO0138982 | | 5/2001 |
| WO | WO0138982 | A1 | 5/2001 |
| WO | WO0158162 | | 8/2001 |
| WO | 02/49314 | A2 | 6/2002 |
| WO | 0249314 | A1 | 6/2002 |
| WO | WO02098112 | | 12/2002 |
| WO | 03/023587 | A2 | 3/2003 |
| WO | 03023587 | A2 | 3/2003 |
| WO | 03040893 | | 5/2003 |
| WO | WO03039081 | A1 | 5/2003 |
| WO | 03061240 | | 7/2003 |
| WO | WO2004015680 | | 2/2004 |
| WO | WO2004110021 | A2 | 12/2004 |
| WO | WO2005018191 | A2 | 2/2005 |
| WO | 2005073955 | A1 | 8/2005 |
| WO | 2005088939 | | 9/2005 |
| WO | 2005091593 | | 9/2005 |
| WO | 2005096594 | | 10/2005 |
| WO | 2005122509 | | 12/2005 |
| WO | WO2006008067 | | 1/2006 |
| WO | 2006058045 | | 6/2006 |
| WO | 2006058050 | | 6/2006 |
| WO | 2006058051 | | 6/2006 |
| WO | 2006058052 | | 6/2006 |
| WO | 2006058053 | | 6/2006 |
| WO | 2006058067 | | 6/2006 |
| WO | 2006058173 | | 6/2006 |
| WO | WO2006058045 | A2 | 6/2006 |
| WO | WO2007051186 | | 5/2007 |

OTHER PUBLICATIONS

Search Report, dated Nov. 8, 2006, for International Application No. PCT/US05/42415, 8 pages.

Plug and Display Standard, Video Electronics Standards Association (VESA) San Jose, CA (Jun. 11, 1997), pp. 1-108.

Plug and Display Standard, Video Electronics Standards Association (VESA) San Jose, CA (Jun. 11, 1997).

VESA Mobile Display Digital Interface, Proposed Standard, Version 1P, Draft 10, Aug. 13, 2003, pp. 1-75.

VESA Mobile Display Digital Interface, Proposed Standard, Version 1P, Draft 10, Aug. 13, 2003, pp. 76-151.

VESA Mobile Display Digital Interface, Proposed Standard, Version 1P, Draft 11, Sep. 10, 2003, pp. 1-75.

VESA Mobile Display Digital Interface, Proposed Standard, Version 1P, Draft 11, Sep. 10, 2003, pp. 76-150.

VESA Mobile Display Digital Interface, Proposed Standard, Version 1P, Draft 13, Oct. 15, 2003, pp. 1-75.

VESA Mobile Display Digital Interface, Proposed Standard, Version 1P, Draft 13, Oct. 15, 2003, pp. 76-154.

VESA Mobile Display Digital Interface, Proposed Standard, Version 1P, Draft 14, Oct. 29, 2003, pp. 1-75.

VESA Mobile Display Digital Interface, Proposed Standard, Version 1P, Draft 14, Oct. 29, 2003, pp. 76-158

(56) References Cited

OTHER PUBLICATIONS

VESA Mobile Display Digital Interface, Proposed Standard, Version 1P, Draft 15, Nov. 12, 2003, pp. 1-75.
VESA Mobile Display Digital Interface, Proposed Standard, Version 1P, Draft 15, Nov. 12, 2003, pp. 76-160.
International Search Report PCT/US05/042643—International Search Authority—US Oct. 5, 2006.
International Search Report PCT/US05/040402—International Search Authority—US Feb. 20, 2007.
International Search Report PCT/US05/040414—International Search Authority—US May 23, 2007.
International Search Report PCT/US05/0402436 International Search Authority—US Oct. 2, 2006.
V4400 published May 31, 2004.
Written Opinion PCT/US05/042643, International Search Authority US, Oct. 5, 2006.
International Preliminary Report on Patentability PCT/US05/042402 IPEA/US Jun. 19, 2007.
Written Opinion PCT/US05/042402 PCT/US05/042402, International Search Authority US, Feb. 20, 2007.
International Preliminary Report on Patentability PCT/US05/042414, International Search Authority—European Patent Office Jun. 19, 2007.
Written Opinion PCT/US05/042414—International Search Authority, US May 23, 2007.
International Search Report PCT/US2005/042413, International Search Authority US, Aug. 25, 2008.
International Preliminary Report on Patentability PCT/US05/042413, International Search Authority US, Aug. 25, 2008.
Written Opinion PCT/US05/042413, International Search Authority US, Aug. 25, 2008.
International Preliminary Report on Patentability PCT/US05/042415, International Search Authority US, Apr. 10, 2007.
Written Opinion PCT/US05/042415, International Search Authority US, Nov. 8, 2006.
Sevanto, J., "Multimedia messaging service for GPRS and UMTS", IEEE on WCNC, Sep. 1999, pp. 1422-1426, vol. 3.
IEEE STD 1394B; IEEE Standard for High Performance Serial Bus—Amendment 2(Dec. 2002).
"Transmission and Multiplexing; High Bit Rate Digital Subscriber Line (HDSL) Transmission System on Metallic Local Lines; HDSL Core Specification and Applications for 2 048 Kbit/S Based Access Digital Sections; ETR 152" European Telecommunications Standard, Dec. 1996.
Liptak, "Instrument Engineer's Handbook, Third Edition, Volume Three: Process Software and Digital Networks, Section 4.17, Proprietary Networks, pp. 627-637, Boca Raton" CRC Press, Jun. 26, 2002.
Masnic, B. et al., "On Linear Unequal Error Protection Codes" IEEE Transactions on Information Theory, vol. IT-3, No. 4, Oct. 1967, pp. 600-607.
European Search Report—EP10172872, Search Authority—Munich Patent Office, Dec. 17, 2010.
European Search Report—EP10172878, Search Authority—Munich Patent Office, Dec. 29, 2010.
European Search Report—EP10172872, Search Authority—Munich Patent Office, Dec. 29, 2010.
European Search Report—EP10172885, Search Authority—Munich Patent Office, Dec. 23, 2010.
Hopkins, K. et al.: "Display Power Management," IP.com Journal; IP.com Inc., West Henrietta, NY (Mar. 1, 1995), XP013103130, ISSN: 1533-0001, vol. 38 No. 3 pp. 425-427.
"Universal Serial Bus Specification—Revision 2.0: Chapter 9—USB Device Framework," Universal Serial Bus Specification, Apr. 27, 2000, pp. 239-274, XP002474828.
VESA: VESA Mobile Display Digital Interface Standard: Version 1, Milpitas, CA (Jul. 23, 2004), pp. 87-171.
3GPP2 C.S0047-0. "Link-Layer Assisted Service Options for Voice-over-IP: Header Remover (SO60) and Robust Header Compression (SO61)," Version 1.0, Apr. 14, 2003, pp. 1-36.
STMicroelectronics: "STV0974 Mobile Imaging DSP Rev.3", Datasheet internet, (Nov. 30, 2004), XP002619368. Retrieved from the Internet: URL: http://pdf1.alldatasheet.com/datasheet-pdf/view/112376/STMICROELECTRONICS/STV0974.html [retrieved on Jan. 27, 2011], pp. 1-69.
Taiwan Search Report—TW094118438—TIPO—Nov. 19, 2011.
"Nokia 6255", Retrieved from the Internet: URL: http://nokiamuseum.com/view.php''model=6255 [retrieved on Feb. 4, 2012].
Supplementary European Search Report—App. No. 05852048.7, Pub No. EP1815625, Search Authority—The Hague Patent Office, Nov. 18, 2010.
Taiwan Search Report—TW093134825—TIPO—Jan. 8, 2012.
Taiwan Search Report—TW094141289—TIPO—Mar. 29, 2012.
European Search Report—EP12157614—Search Authority—The Hague—Aug. 1, 2012.

* cited by examiner

METHODS AND SYSTEMS FOR UPDATING A BUFFER

CROSS REFERENCE TO RELATED APPLICATIONS

The present application claims priority to Provisional Application No. 60/630,853 entitled "MDDI Host Core Design" filed Nov. 24, 2004, Provisional Application No. 60/631,549 entitled "Mobile Display Digital Interface Host Camera Interface Device" filed Nov. 30, 2004, Provisional Application No. 60/632,825 entitled "Camera MDDI Host Device" filed Dec. 2, 2004, Provisional Application No. 60/633,071 entitled "MDDI Overview" filed Dec. 2, 2004, Provisional Application No. 60/633,084 entitled "MDDI Host Core Pad Design" filed Dec. 2, 2004, and Provisional Application No. 60/632,852 entitled "Implementation of the MDDI Host Controller" filed Dec. 2, 2004, and assigned to the assignee hereof and hereby expressly incorporated by reference herein in their entirety.

The present application is also related to commonly assigned U.S. Pat. No. 6,760,772 B2, titled "Generating and Implementing a Communication Protocol and Interface for High Speed Data Transfer", issued Jul. 6, 2004, the disclosure of which is incorporated herein by reference.

BACKGROUND

1. Field of the Invention

The present invention relates generally to methods and systems for updating a buffer. More particularly, the invention relates to methods and systems for updating a buffer across a communication link.

2. Background of the Invention

In the field of interconnect technologies, demand for ever increasing data rates, especially as related to video presentations, continues to grow.

The Mobile Display Digital Interface (MDDI) is a cost-effective, low power consumption, transfer mechanism that enables very-high-speed data transfer over a short-range communication link between a host and a client. MDDI requires a minimum of just four wires plus power for bi-directional data transfer that delivers a maximum bandwidth of up to 3.2 Gbits per second.

In one application, MDDI increases reliability and decreases power consumption in clamshell phones by significantly reducing the number of wires that run across a handset's hinge to interconnect the digital baseband controller with an LCD display and/or a camera. This reduction of wires also allows handset manufacturers to lower development costs by simplifying clamshell or sliding handset designs.

In controlling an LCD display across an MDDI link, one problem that arises relates to image flickering when the display is refreshed. Typically, what is needed is either a long persistence conversion or a refresh rate that is higher than what the human eye can perceive. Long persistence conversion results in image smearing when images appear to move. Therefore, it is desirable for the display to have a high refresh rate. A typical problem that occurs, however, is image tearing. The problem is that while the display is being refreshed at a high rate, the frame buffer associated with the display is being filled at a slower rate. As a result, the display image may reflect both updated and old image information within the same frame of the display.

In one solution, multiple buffers are used and image information is cycled through the multiple buffers to avoid the image tearing problem described above. This includes commonly known "double buffering" approaches. The drawback of such solution, however, is clearly in the increased cost and chip space requirements in implementation.

What is needed therefore are methods and systems to enable buffer update solutions that solve the above described problems while satisfying the cost and space requirements of MDDI applications.

SUMMARY

The present invention relates to methods and systems for updating a buffer.

In one aspect, the present invention provides a method for updating a buffer, which includes strategically writing to the buffer to enable concurrent read and write to the buffer. The method eliminates the need for double buffering, thereby resulting in implementation cost and space savings compared to conventional buffering approaches. Among other advantages, the method prevents image tearing when used to update a frame buffer associated with a display, but is not limited to such applications.

In another aspect, the present invention provides efficient mechanisms to enable buffer update across a communication link. In one example, the present invention provides a method for relaying timing information across a communication link. The method, however, is not limited to relaying timing information, and may be used in more general contexts as can be understood by persons skilled in the art(s) based on the teachings herein.

Further embodiments, features, and advantages of the present invention, as well as the structure and operation of the various embodiments of the present invention, are described in detail below with reference to the accompanying drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION

Figure 1:
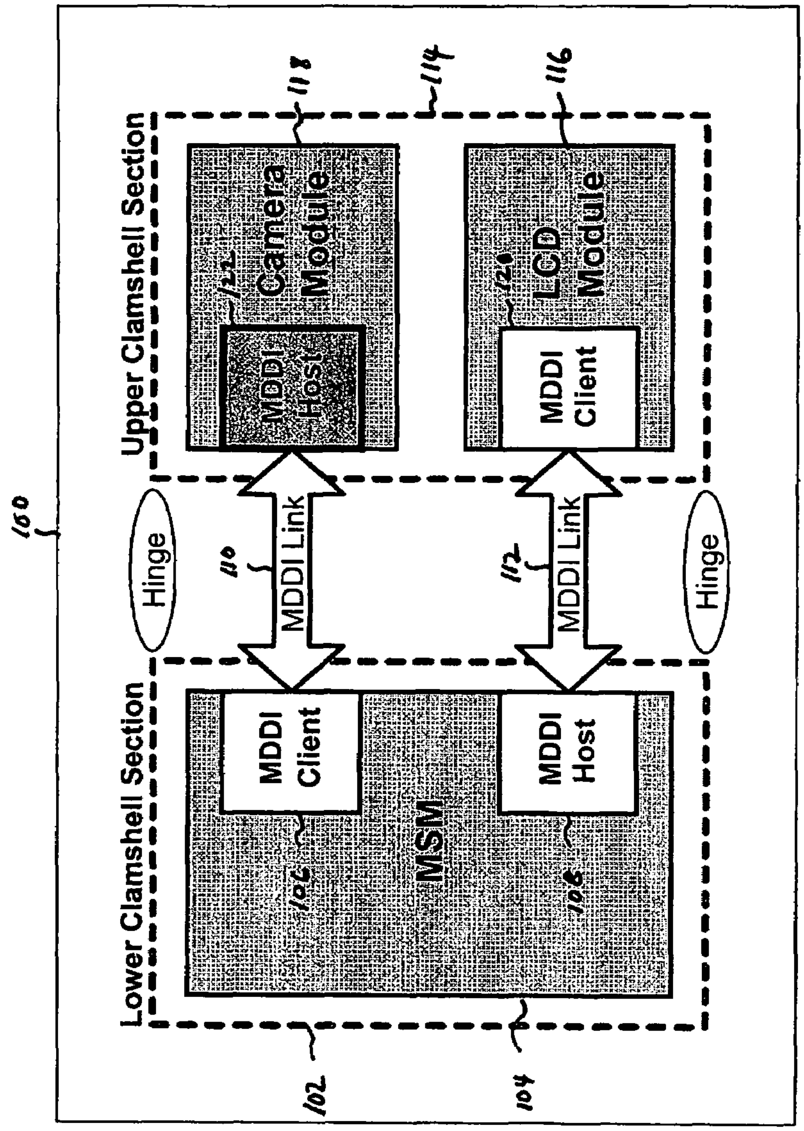
FIG. 1 is a block diagram that illustrates an example environment using a Mobile Display Digital Interface (MDDI) interface.

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Mobile Display Digital Interface (MDDI)

The Mobile Display Digital Interface (MDDI) is a cost-effective, low power consumption, transfer mechanism that enables very-high-speed serial data transfer over a short-range communication link between a host and a client.

In the following, examples of MDDI will be presented with respect to a camera module contained in an upper clamshell of a mobile phone. However, it would be apparent to persons skilled in the relevant art(s) that any module having functionally equivalent features to the camera module could be readily substituted and used in embodiments of this invention.

Further, according to embodiments of the invention, an MDDI host may comprise one of several types of devices that can benefit from using the present invention. For example, the host could be a portable computer in the form of a handheld, laptop, or similar mobile computing device. It could also be a Personal Data Assistant (PDA), a paging device, or one of many wireless telephones or modems. Alternatively, the host could be a portable entertainment or presentation device such as a portable DVD or CD player, or a game playing device. Furthermore, the host can reside as a host device or control element in a variety of other widely used or planned commercial products for which a high speed communication link is desired with a client. For example, a host could be used to transfer data at high rates from a video recording device to a storage based client for improved response, or to a high resolution larger screen for presentations. An appliance such as a refrigerator that incorporates an onboard inventory or computing system and/or Bluetooth connections to other household devices, can have improved display capabilities when operating in an internet or Bluetooth connected mode, or have reduced wiring needs for in-the-door displays (a client) and keypads or scanners (client) while the electronic computer or control systems (host) reside elsewhere in the cabinet. In general, those skilled in the art will appreciate the wide variety of modern electronic devices and appliances that may benefit from the use of this interface, as well as the ability to retrofit older devices with higher data rate transport of information utilizing limited numbers of conductors available in either newly added or existing connectors or cables. At the same time, an MDDI client may comprise a variety of devices useful for presenting information to an end user, or presenting information from a user to the host. For example, a micro-display incorporated in goggles or glasses, a projection device built into a hat or helmet, a small screen or even holographic element built into a vehicle, such as in a window or windshield, or various speaker, headphone, or sound systems for presenting high quality sound or music. Other presentation devices include projectors or projection devices used to present information for meetings, or for movies and television images. Another example would be the use of touch pads or sensitive devices, voice recognition input devices, security scanners, and so forth that may be called upon to transfer a significant amount of information from a device or system user with little actual "input" other than touch or sound from the user. In addition, docking stations for computers and car kits or desk-top kits and holders for wireless telephones may act as interface devices to end users or to other devices and equipment, and employ either clients (output or input devices such as mice) or hosts to assist in the transfer of data, especially where high speed networks are involved. However, those skilled in the art will readily recognize that the present invention is not limited to these devices, there being many other devices on the market, and proposed for use, that are intended to provide end users with high quality images and sound, either in terms of storage and transport or in terms of presentation at playback. The present invention is useful in increasing the data throughput between various elements or devices to accommodate the high data rates needed for realizing the desired user experience.

Figure 1A:
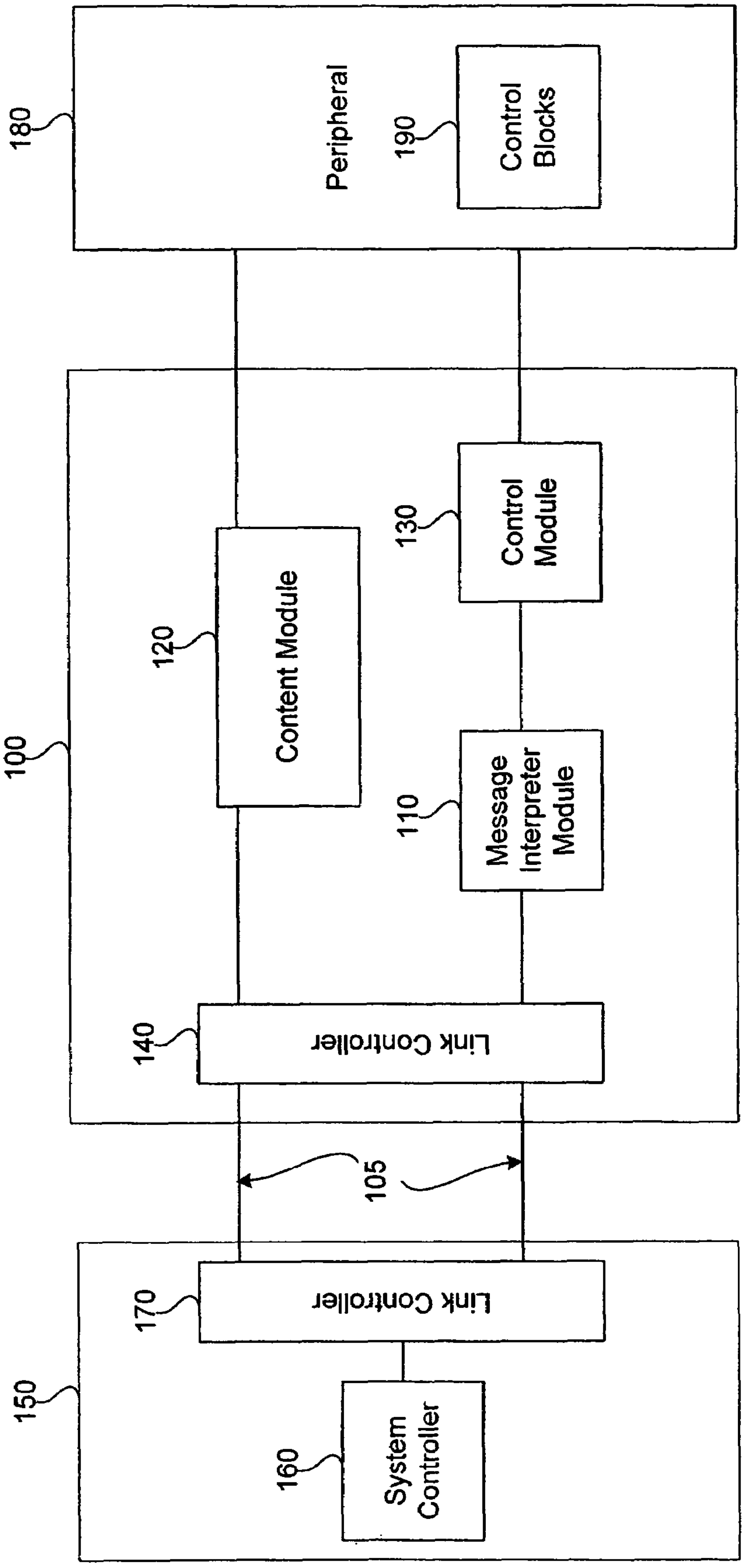
FIG. 1A is a diagram of a digital data device interface coupled to a digital device and a peripheral device.

FIG. 1A is a diagram of a digital data device interface 100 coupled to a digital device 150 and a peripheral device 180. Digital device 150 can include, but is not limited to, a cellular telephone, a personal data assistant, a smart phone or a personal computer. In general digital device 150 can include any type of digital device that serves as a processing unit for digital instructions and the processing of digital presentation data. Digital device 150 includes a system controller 160 and a link controller 170.

Peripheral device 180 can include, but is not limited to, a camera, a bar code reader, an image scanner, an audio device, and a sensor. In general peripheral 180 can include any type of audio, video or image capture and display device in which digital presentation data is exchanged between a peripheral and a processing unit. Peripheral 180 includes control blocks 190. When peripheral 180 is a camera, for example, control blocks 190 can include, but are not limited to lens control, flash or white LED control and shutter control. Digital presentation data can include digital data representing audio, image and multimedia data.

Digital data interface device 100 transfers digital presentation data at a high rate over a communication link 105. In one example, an MDDI communication link can be used which supports bi-directional data transfer with a maximum bandwidth of 3.2 Gbits per second. Other high rates of data transfer that are higher or lower than this example rate can be supported depending on the communications link. Digital data interface device 100 includes a message interpreter module 110, a content module 120, a control module 130 and a link controller 140.

Link controller 140, which is located within digital data interface 100, and link controller 170, which is located within digital device 150 establish communication link 105. Link controller 140 and link controller 170 may be MDDI link controllers.

The Video Electronics Standards Association ("VESA") MDDI Standard, which is incorporated herein by reference in its entirety, describes the requirements of a high-speed digital packet interface that lets portable devices transport digital images from small portable devices to larger external displays. MDDI applies a miniature connector system and thin flexible cable ideal for linking portable computing, communications and entertainment devices to emerging products such as wearable micro displays. It also includes information on how to simplify connections between host processors and a display device, in order to reduce the cost and increase the reliability of these connections. Link controllers 140 and 170 establish communication path 105 based on the VESA MDDI Standard.

U.S. Pat. No. 6,760,772, entitled Generating and Implementing a Communication Protocol and Interface for High Data Rate Signal Transfer, issued to Zou et al. on Jul. 6, 2004 ('772 Patent") describes a data interface for transferring digital data between a host and a client over a communication path using packet structures linked together to form a communication protocol for presentation data. Embodiments of the invention taught in the '772 Patent are directed to an MDDI interface. The signal protocol is used by link controllers, such as link controllers 140 and 170, configured to generate, transmit, and receive packets forming the communications protocol, and to form digital data into one or more types of data packets, with at least one residing in the host device and being coupled to the client through a communications path, such as communications path 105.

The interface provides a cost-effective, low power, bi-directional, high-speed data transfer mechanism over a short-range "serial" type data link, which lends itself to implementation with miniature connectors and thin flexible cables. An embodiment of link controllers 140 and 170 establishes communication path 105 based on the teachings of the '772 Patent. The '772 Patent is herein incorporated by reference in its entirety.

In other embodiments, link controllers 140 and 170 can both be a USB link controller or they both can include a combination of controllers, such as for example, an MDDI link controller and another type of link controller, such as, for example, a USB link controller. Alternatively, link controllers 140 and 170 can include a combination of controllers, such as an MDDI link controller and a single link for exchanging acknowledgement messages between digital data interface device 100 and digital device 150. Link controllers 140 and 170 additionally can support other types of interfaces, such as an Ethernet or RS-232 serial port interface. Additional interfaces can be supported as will be known by individuals skilled in the relevant arts based on the teachings herein.

Within digital data interface device 100, message interpreter module 110 receives commands from and generates response messages through communication link 105 to system controller 160, interprets the command messages, and routes the information content of the commands to an appropriate module within digital data interface device 100.

Content module 120 receives data from peripheral device 180, stores the data and transfers the data to system controller 160 through communication link 105.

Control module 130 receives information from message interpreter 130, and routes information to control blocks 190 of peripheral device 180. Control module 130 can also receive information from control blocks 190 and routes the information to the message interpreter module 110.

FIG. 1 is a block diagram that illustrates an example environment using an MDDI interface. In the example of FIG. 1, MDDI is used to interconnect modules across the hinge of a clamshell phone 100.

Referring to FIG. 1, a lower clamshell section 102 of clamshell phone 100 includes a Mobile Station Modem (MSM) baseband chip 104. MSM 104 is a digital baseband controller. An upper clamshell section 114 of clamshell phone 100 includes a Liquid Crystal Display (LCD) module 116 and a camera module 118.

Still referring to FIG. 1, an MDDI link 110 connects camera module 118 to MSM 104. Typically, an MDDI link controller is integrated into each of camera module 118 and MSM 104. In the example of FIG. 1, an MDDI Host 122 is integrated into camera module 112, while an MDDI Client 106 resides on the MSM side of the MDDI link 110. Typically, the MDDI host is the master controller of the MDDI link. In the example of FIG. 1, pixel data from camera module 118 are received and formatted into MDDI packets by MDDI Host 122 before being transmitted onto MDDI link 110. MDDI client 106 receives the MDDI packets and re-converts them into pixel data of the same format as generated by camera module 118. The pixel data are then sent to an appropriate block in MSM 104 for processing.

Still referring to FIG. 1, an MDDI link 112 connects LCD module 116 to MSM 104. In the example of FIG. 1, MDDI link 112 interconnects an MDDI Host 108, integrated into MSM 104, and an MDDI Client 120 integrated into LCD module 116. In the example of FIG. 1, image data generated by a graphics controller of MSM 104 are received and formatted into MDDI packets by MDDI Host 108 before being transmitted onto MDDI link 112. MDDI client 120 receives the MDDI packets and re-converts them into image data for use by LCD module 116. Typically, image data is buffered using a frame buffer before being used to refresh the LCD display.

Figure 2:
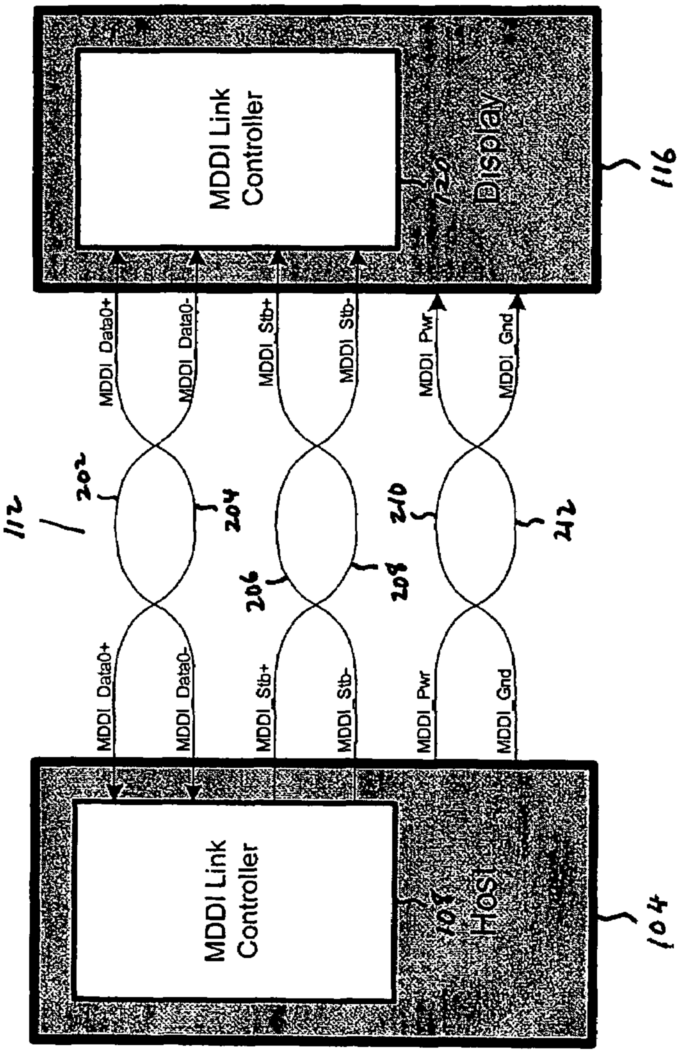
FIG. 2 is a block diagram that illustrates an MDDI link interconnection according to an embodiment of the example of FIG. 1.

FIG. 2 is a block diagram that illustrates MDDI link interconnection 112 according to the example of FIG. 1. As described above, one of the functions of MDDI link 112 is to transfer image data from MSM 104 to LCD Module 116. A frame interface (not shown in FIG. 2) connects MDDI link controller 120 to modules of LCD Module 116. Similarly, another frame interface (not shown in FIG. 2) connects MDDI link controller 108 to appropriate modules of MSM 104. Typically, MDDI link controller 108 represents the host controller of the MDDI link, while MDDI link controller 120 represents the client controller of the MDDI. Other implementations, however, may reverse the roles of the two controllers.

MDDI link 112 includes a minimum of four wires, comprising two wires for data signals 202 and 204 and two wires for probe signals 206 and 208, in addition to two wires for power signals 210 and 211. Data signals 202 and 204 are bi-directional. Accordingly, data can be transmitted in either direction (from host to client and vice versa) using data signals 202 and 204. Strobe signals 206 and 208 are unidirectional, and may only be driven by the host controller of the link. Accordingly, in the example of FIG. 2, only host controller 108 may drive strobe signals 206 and 208.

Method and Systems for Updating a Buffer

As described above, MDDI can be used to connect a baseband processor (MSM 104 in FIG. 2, for example) and a graphics controller (LCD module 116 in FIG. 2, for example). The baseband processor channels image information, typically received from a camera sensor, to the graphics controller, which uses the image information to create a display image. Typically, the graphics controller employs one or more frame buffers to store the image information received from the baseband processor before using it to generate the display image. As described above, image tearing is one problem that occurs. This happens when the image information is being read out of the frame buffer at a rate slower or faster than the rate at which it is being written to the frame buffer. Methods and systems for updating a buffer, which, among other advantages, solve the image tearing problem, will be described herein. It should be noted, however, that methods and systems according to the present invention are not limited to the specific exemplary embodiments in which they will described or to being used in an MDDI environment. Further, methods and systems of the present invention can be employed in various other applications that utilize buffering, and that may benefit from the advantages of the present invention.

Image Tearing

Figure 3:
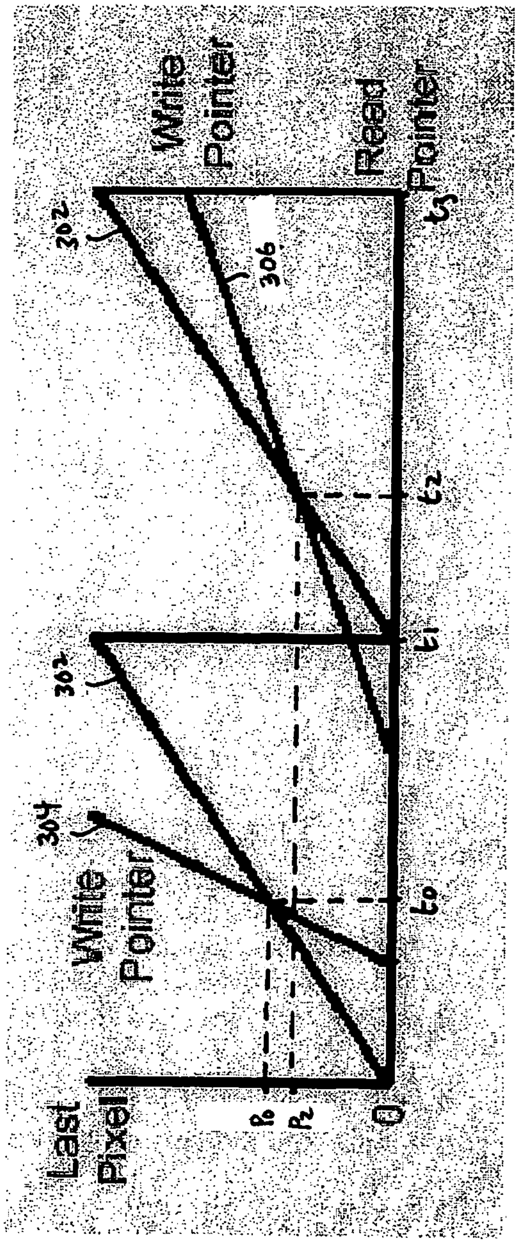
FIG. 3 is an example that illustrates the image tearing problem.

FIG. 3 illustrates two examples of image tearing that can occur while reading from and/or writing to a buffer. The diagram of FIG. 3 shows plots of read and write pointers as functions of buffer position and time. The read pointer represents the position in the buffer that is being read. The write pointer indicates the position in the buffer that is being written to. In the example of FIG. 3, the buffer position is defined in terms of pixel position in the buffer.

In the first example in FIG. 3, the buffer is being read at a slower rate than it is written to. This is illustrated by the relative slopes of read and write pointer lines 302 and 304. Note that read and write pointer lines 302 and 304 intersect at time $t_0$. Before time $t_0$, pixels in the buffer are being read prior to being updated. After time $t_0$, pixels are being updated prior to be read. Accordingly, within the same frame (from time 0 to time $t_1$), pixels in positions 0 to $p_0$ (which corresponds to the pixel position read at time $t_0$) are read with older image information relative to pixels from position $p_0$ to the last pixel in the buffer, which are read with updated image information. The result is image tearing with a lower portion of the image reflecting newer image information relative to an upper portion of the image.

In the second example in FIG. 3, the buffer is being read at a faster rate than it is written to. This is illustrated by the relative slopes of read and write pointer lines 302 and 306. Read and write pointer lines 302 and 306 intersect at time $t_2$. Before time $t_2$, pixels in the buffer are being updated prior to being read. After time $t_2$, pixels are being read prior to being updated. Accordingly, within the same frame (from time $t_1$ to time $t_3$), pixels in positions 0 to $p_2$ (which corresponds to the pixel position read at time $t_2$) are read with newer image information relative to pixels from position $p_2$ to the last pixel in the buffer, which are read with old image information. The result is image tearing with an upper portion of the image reflecting newer image information relative to a lower portion of the image.

Method for Updating a Buffer

A method to strategically update a buffer will now be provided. The method prevents image tearing when used to update a frame buffer associated with a display. The method may also be used in other buffering applications based on its apparent advantages as will be described herein.

Figure 4:
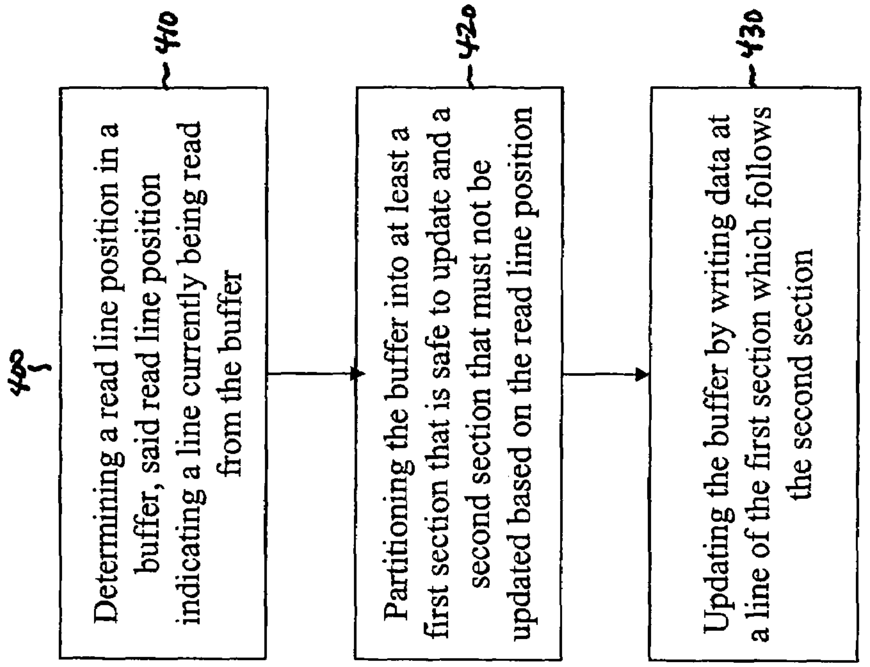
FIG. 4 is a process flowchart that illustrates a method for updating a buffer according to the present invention.

FIG. 4 is a process flowchart 400 that illustrates a method for updating a buffer according to the present invention. Process flowchart 400 begins in step 410, which includes determining a read line position in the buffer. The read line position indicates a line currently being read from the buffer. Typically, step 410 is achieved by determining the value of a read pointer that points to the read line position in the buffer.

Step 420 includes partitioning the buffer into at least a first section that is safe to update and a second section that must not be updated based on the read line position. It is noted here that partitioning the buffer does not refer here to a physical but to a logical partitioning of the buffer. Further, a logical partition of the buffer is not fixed and may change as will be understood from the teachings herein. The first section of the buffer includes lines of the buffer that have been read within the current buffer reading cycle based on the read line position. The first section also includes lines of the buffer that can be updated based on the read line position. In other words, the first section includes lines whose content has just been read or lines that can be updated prior to the read line position reaching them based on the buffer read speed and the buffer write speed. Lines that cannot be updated prior to the read line position reaching them based on the buffer read speed and the buffer write speed belong to the second section of the buffer. In other words, lines of the second section of the buffer are those for which there is not sufficient time to update before they have to be read. Accordingly, lines of the second section of the buffer must have been updated during the last reading cycle of the buffer.

Step 430 includes updating the buffer by writing data at a line of the first section which follows the second section based on the read line position. Typically, the buffer is updated at a position which is both safe to update as described above and which has already been read during the last reading cycle of the buffer. In one embodiment, step 430 includes writing data at a line of the first section which immediately follows the last line of the second section. Other variations of step 430 may also be possible as will be apparent to a person skilled in the art based on the teachings disclosed herein.

Example Illustration

Figure 5:
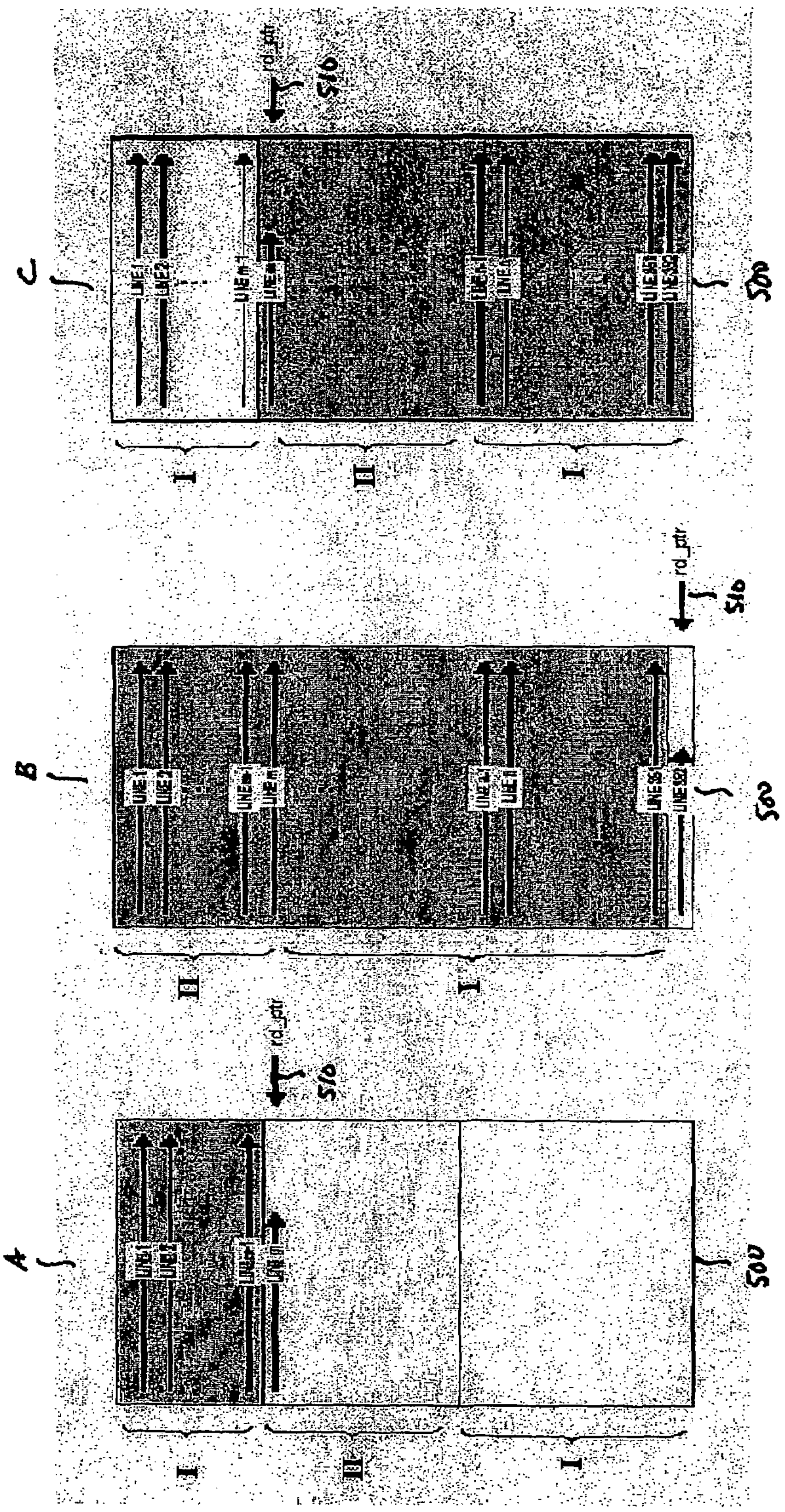
FIG. 5 illustrates examples of the method of FIG. 4.

FIG. 5 provides examples that illustrate the method described above in FIG. 4. FIG. 5 shows three examples A, B, and C of reading a buffer 500. For purposes of illustration only, buffer 500 is shown to include 352 lines of data. A read pointer 510 indicates the read line position in the buffer. Sections labeled with the roman numeral "I" represent lines that belong to the first section of the buffer as described above. Sections labeled with the roman numeral "II" represent lines that belong to the second section of the buffer as described above.

In example A, shaded area "I" represents lines of the first section of the buffer which have already been read during the current reading cycle of the buffer. In the example, this area includes lines 1 through m-1. Read pointer 510 indicates that line m is currently being read. Accordingly, area "II" in example A represents lines of buffer 500 that cannot be updated based on the current position of read pointer 510. In other words, there is no sufficient time to update lines in area "II" based on the current position of read pointer 510 and the read and write speeds to the buffer. Note that the first section of the buffer also includes an unshaded area "I" below area "II". This area "I" belongs to the first section as it is safe to update, but should not be updated given that it has not been read during the current reading cycle of the buffer. Updating unshaded area "I" prior to reading it would result in image tearing, as described in FIG. 3, where the upper portion of the image reflects older image information relative to the lower portion of the image.

In example B, the shaded area represents lines of the buffer which have already been read during the current reading cycle of the buffer. In the example, this area includes lines 1 through 351. Read pointer 510 indicates that line 352 is currently being read. Accordingly, area "II" in example B represents lines that must have been updated given the current read line position. Lines in area "II" cannot be updated based on the current read line position and the read and write speeds to the buffer, and belong to the second section of the buffer based on the description above. Lines in area "I" belong to the first section of the buffer, and are safe to update. To update the buffer, writing can begin in area "I". Data can be written at a line in area "I" that immediately follows area "II". This corresponds to line m in example B.

Example C illustrates a scenario subsequent to the one shown in B. In example C, read pointer 510 has wrapped around and is reading line m of the buffer. Accordingly, lines preceding the read pointer in the buffer belong to the first section of the buffer, and may be updated. Lines in area "II" must have been updated during the last write cycle to the buffer given the current read line position. Lines in area "II" cannot be updated, and belong to the second section of the buffer as described above. In other words, lines in area "II" must contain updated information given the read line position, as there is not sufficient time to update them before they have to be read. Shaded area "I" represents lines of the first section of the buffer that are safe to update, but should not be updated given that they have not been read during the last reading cycle of the buffer.

Buffer Read/Write Strategies

Buffer read/write strategies to avoid image tearing or equivalent problems related to buffer update are described herein. Buffer update strategies according to the present invention further eliminate the need for the commonly adopted "double buffering" technique. Instead, a single buffer is used, which results in both implementation cost and space savings. The present invention is not limited to the exemplary strategies described herein, and variations which are apparent to persons skilled in the art(s) are also considered to be within the scope of the present invention.

Figure 6A:
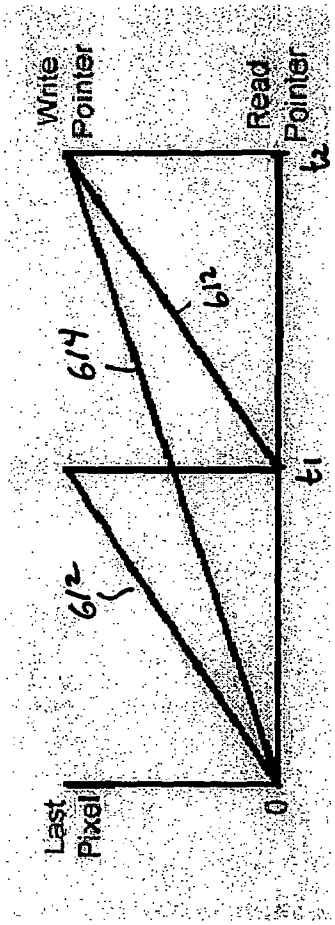
FIGS. 6A, 6B illustrate buffer read/write strategies.
Figure 6B:
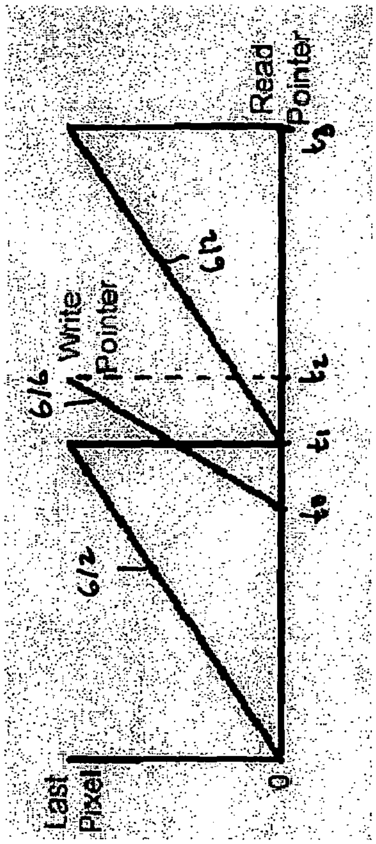

FIGS. 6A and 6B illustrate exemplary buffer read/write strategies according to the present invention. The diagrams of FIGS. 6A and 6B show plots of read pointer 612 and write pointers 614 and 616 as functions of buffer position and time. In the examples of FIGS. 6A and 6B, the buffer position is defined in terms of pixel position in the buffer, which may be equivalently replaced with any other measure of buffer position, such as line number, for example.

Referring to FIG. 6A, an exemplary buffer read/write strategy is depicted over two reading cycles of the buffer. In the first reading cycle, from time 0 to time $t_1$, the first half of the buffer is updated, while the entire buffer content is read. In the second reading cycle of the buffer, from time $t_1$ to time $t_2$, the second half of the buffer is updated, while the entire buffer content is read. Note that the first half of the buffer, during the second reading cycle, contains updated information that were written to the buffer during the first reading cycle. The second half of the buffer, during the second cycle, is updated prior to being read as shown by write pointer 614 preceding read pointer 612 in time over the second reading cycle. Accordingly, over both reading cycles, data read from the buffer belongs to the same update cycle of the buffer, and no image tearing occurs.

FIG. 6B illustrates another exemplary buffer read/write strategy over two reading cycles of the buffer. During the first reading cycle, the first half of the buffer is updated from time $t_0$ to time $t_1$. During the second reading cycle, the second half of the buffer is updated from time $t_1$ to time $t_2$. Note that writing to the buffer starts at a time $t_0$ during the first cycle such that, during the first cycle, the entire buffer is read with an initial information content and not an updated content due to the writing process. On the other hand, writing to the buffer ends at a time $t_2$ during the second cycle such that, during the second cycle, the entire buffer contains updated information content when it is read. This is shown by write pointer 616 preceding read pointer 612 in time over the second reading cycle. Accordingly, image tearing will not occur over both reading cycles in the example of FIG. 6B.

Buffer Update through a Communication Link

Methods and systems for updating a buffer according to the present invention may be used in a variety of applications. In one application, as described above, the buffer update approach may be used to update a frame buffer associated with a display. In another application, the buffer is updated remotely, wherein it is written to by a first processor and is read by a second processor, and wherein the first and second processors communicate through a communication link. For example, the first and second processors represent an MSM baseband processor and an LCD module, respectively, that communicate through an MDDI link, as illustrated in FIG. 2. In certain applications, synchronization between the first and second processors will be required.

Methods and systems related to synchronization to enable buffer update across a communication link will now be provided. As will be understood by a person skilled in the art(s) based on the teachings herein, certain aspects of the methods and systems that will be presented may be applicable to synchronization problems in general, and are not limited to synchronization for enabling remote buffer update.

In one aspect, synchronization between the first and second processors includes scheduling a first event at the first processor that is triggered by a second event at the second processor. This is typically done by writing to a register to enable the triggering of an interrupt that causes the first event at the first processor whenever the second event occurs at the second processor. For example, in a remote buffer update application, where the buffer is updated by the first processor and read by the second processor, the first event may represent the need to start writing to the buffer, while the second event may represent that the read pointer has finished a complete reading cycle of the buffer. The second event may then be triggered at the second processor based on the read line position in the buffer.

Figure 7:
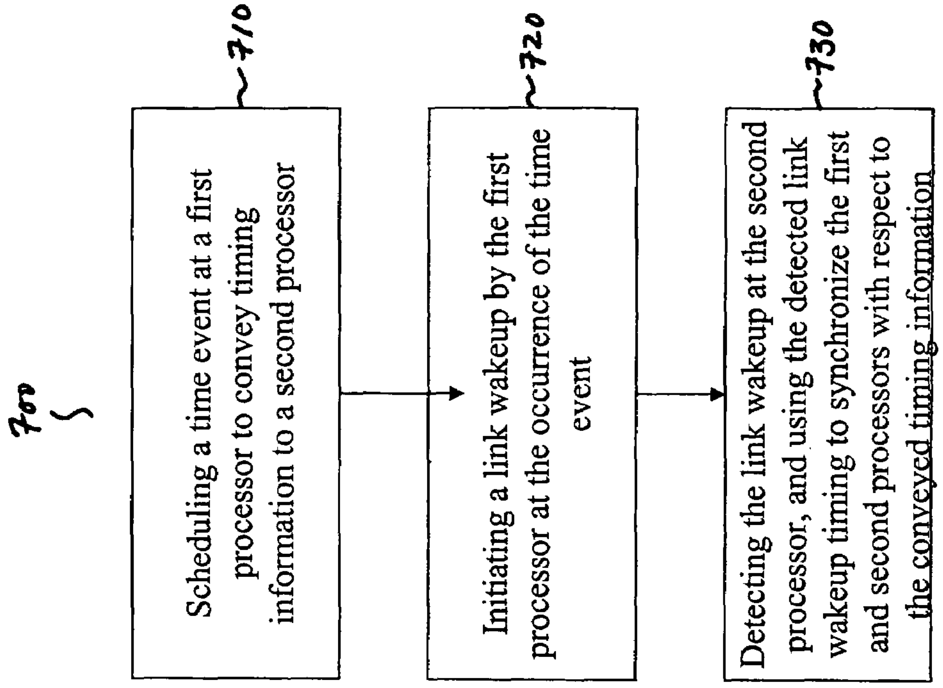
FIG. 7 is a process flowchart that illustrates a method for conveying timing information across a communication link according to the present invention.

In another aspect, methods to convey synchronization information across the communication link are provided. The methods may be employed to relay synchronization information related to buffer update, as described above, for example. FIG. 7 is a process flowchart 700 that illustrates a method for conveying timing information across a communication link between a first processor and a second processor, when the communication link is in hibernation mode. Process flowchart 700 begins in step 710, which includes scheduling a time event at the first processor to convey timing information to the second processor. The time event may be a periodic event as required by the specific application. For example, in the case of a buffer update application, the time event may be related to the read line position in the buffer.

Step 720 includes initiating a link wakeup by the first processor at the occurrence of the time event. For example, in the case of a buffer update across an MDDI link, where an MDDI client is located at the LCD module side of the interconnection, the MDDI client may initiate a link wakeup by driving the data signal to a logic one to notify the MDDI host that the buffer should be updated.

Subsequently, step 730 includes detecting the link wakeup at the second processor (for example, an MDDI host on the MSM side of the MDDI interconnection), and using the detected link wakeup timing to synchronize the first and second processors with respect to the timing information that is being conveyed. For example, in the case of a buffer update across an MDDI link, when the MDDI host detects the link wakeup by the MDDI client, it can synchronize itself with the MDDI client with respect to the buffer update start time.

It can be appreciated by a person skilled in the art based on the teachings herein that the method described in FIG. 7 may be extended to convey any kind of timing information across a communication link, and is not limited to buffer update synchronization purposes. The advantages of such method are through saving the link and conveying information by simply waking the link up.

Figure 8:
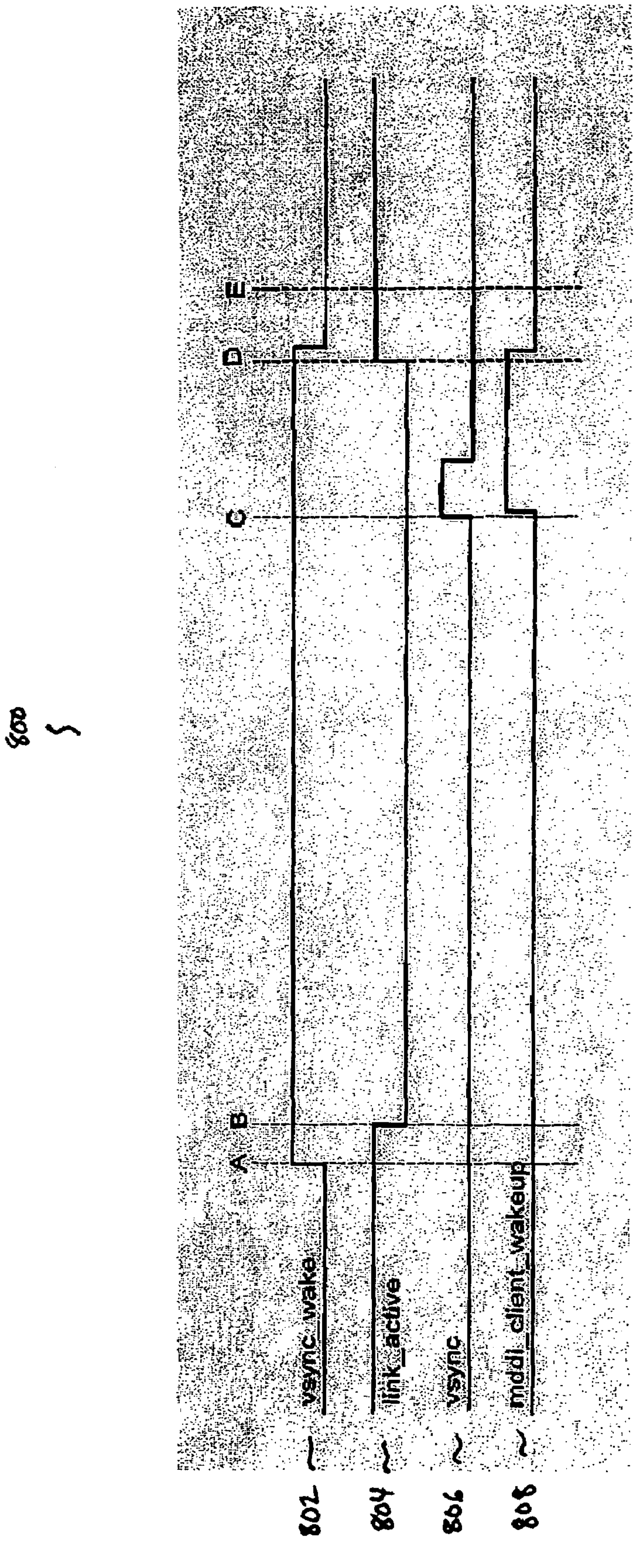
FIG. 8 illustrates an example signal timing diagram for initiating MDDI link wakeup to convey timing information.

FIG. 8 illustrates an example timing diagram 800 for initiating link wakeup to convey timing information across an MDDI interconnection. For example, the MDDI interconnection may be such as the one described above with reference to FIG. 2 with an MDDI host located at the MSM and an MDDI client located at the LCD module. The MDDI client, accordingly, would initiate a link wakeup to convey buffer update information to the MDDI host, which, in turn, would start refreshing the buffer located in the LCD module. In the example of FIG. 8, vsync_wake signal 802 represents a value written to a register at the MDDI host to enable a wakeup at the host based on vsync signal 806. Wakeup at the host occurs whenever the value of vsync_wake 802 is high. Vsync signal 806 represents a value of a signal "vertical sync", which occurs at the client and is related to buffer update time. For example, vsync 806 goes high whenever the read pointer has wrapped and is reading from the beginning of the buffer. Link_active signal 804 represents whether or not the data signal of the MDDI interconnection is active or in hibernation. Mddi_client_wakeup signal 808 represents a signal at the client, which responds to vsync 806 to wake up the client.

In the example of FIG. 8, vsync_wake 802 is set at the host at time A. At time B, the MDDI link goes into hibernation mode. At time C, vsync 806 goes high indicating that the buffer needs to be refreshed by the host. As a result, mddi_client_wakeup 808 also goes high to wake the client up to initiate the link wakeup. The client initiates the link wakeup by driving the data signal of the interconnection, and the link goes active at time D. Subsequently, vsync_wake 802 and mddi_client_wakeup return to zero, and the host detects the link wakeup and begins to refresh the buffer at the client.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for updating a buffer having a plurality of lines associated with a display to prevent image tearing, comprising:

(a) determining a read line position in the buffer, said read line position indicating a line currently being read from the buffer;

(b) partitioning the buffer into at least a first section that is safe to update and a second section that must not be updated based on the read line position; and (c) writing data at a line of the first section to update the buffer, wherein the line follows the second section based on the read line position.

2. The method of claim 1, wherein the read line position is determined by determining a read pointer value.

3. The method of claim 1, wherein the first section of the buffer comprises at least one of:

(i) lines of the buffer that have been read in a last reading cycle of the buffer; and (ii) lines of the buffer that can be updated based on the read line position.

4. The method of claim 3, wherein (ii) further comprises lines of the buffer that can be updated prior to the read line position reaching said lines based on a buffer read speed and a buffer write speed.

5. The method of claim 1, wherein the second section of the buffer comprises lines of the buffer that cannot be updated prior to the read line position reaching said lines based on a buffer read speed and a buffer write speed.

6. The method of claim 5, wherein the second section of the buffer further comprises lines that must have been updated during a last reading cycle of the buffer.

7. An apparatus for updating a buffer having a plurality of lines associated with a display to prevent image tearing, comprising:

a processor configured to:

(a) determine a read line position in the buffer in a controller circuit in the processor, said read line position indicating a line currently being read from the buffer, the read line position comprising a pixel position;

(b) partition the buffer into at least a first section that is safe to update and a second section that must not be updated based on the read line position in the controller circuit in the processor; and (c) write data at a line of the first section to update the buffer in the controller circuit in the processor, wherein the line follows the second section based on the read line position.

8. The apparatus of claim 1, wherein the processor is further configured to determine the read line position by determining a read pointer value.

9. The apparatus of claim 1, wherein the first section of the buffer comprises at least one of:

(i) lines of the buffer that have been read in a last reading cycle of the buffer; and (ii) lines of the buffer that can be updated based on the read line position.

10. The apparatus of claim 9, wherein (ii) further comprises lines of the buffer that can be updated prior to the read line position reaching said lines based on a buffer read speed and a buffer write speed.

11. The apparatus of claim 1, wherein the second section of the buffer comprises lines of the buffer that cannot be updated prior to the read line position reaching said lines based on a buffer read speed and a buffer write speed.

12. The apparatus of claim 11, wherein the second section of the buffer further comprises lines that must have been updated during a last reading cycle of the buffer.

13. An apparatus for updating a buffer having a plurality of lines associated with a display to prevent image tearing, comprising;

a processor in a controller circuit;

means for determining a read line position in the buffer by.the processor, said read line position indicating a line currently being read from the buffer, the read line position comprising a pixel position;

means for partitioning the buffer into at least a first section that is safe to update and a second section that must not be updated based on the read line position by the processor; and means for writing data at a line of the first section to update the buffer, wherein the line follows the second section based on the read line position by the processor.

14. The apparatus of claim 13, further comprising means for determining a read pointer value by the processor.

15. The apparatus of claim 13, wherein the first section of the buffer comprises at least one of:

(i) lines of the buffer that have been read in a last reading cycle of the buffer; and (ii) lines of the buffer that can be updated based on the read line position.

16. The apparatus of claim 15, wherein (ii) further comprises lines of the buffer that can be updated prior to the read line position reaching said lines based on a buffer read speed and a buffer write speed by the processor.

17. The apparatus of claim 13, wherein the second section of the buffer comprises lines of the buffer that cannot be updated prior to the read line position reaching said lines based on a buffer read speed and a buffer write speed.

18. The apparatus of claim 17, wherein the second section of the buffer further comprises lines that must have been updated during a last reading cycle of the buffer.

19. A non-transitory storage media comprising program instructions which are executed on a computer to implement an update of a buffer having a plurality of lines associated with a display to prevent image tearing, the storage media comprising:

(a) program instruction that cause a read line position in the buffer to be determined, said read line position indicating a line currently being read from the buffer, the read line position comprising a pixel position;

(b) program instructions that cause the buffer to be partitioned into at least a first section that is safe to update and a second section that must not be updated based on the read line position; and (c) program instructions that cause data to be written at a line of the first section to update the buffer, wherein the line follows the second section based on the read line position.

20. The non-transitory storage media of claim 19, further comprising program instructions that cause a read pointer value to be determined.

21. The non-transitory storage media of claim 19, wherein the first section of the buffer comprises at least one of:

(i) lines of the buffer that have been read in a last reading cycle of the buffer; and (ii) lines of the buffer that can be updated based on the read line position.

22. The non-transitory storage media of claim 21, wherein (ii) further comprises lines of the buffer that can be updated prior to the read line position reaching said lines based on a buffer read speed and a buffer write speed.

23. The non-transitory storage media of claim 19, wherein the second section of the buffer comprises lines of the buffer that cannot be updated prior to the read line position reaching said lines based on a buffer read speed and a buffer write speed.

24. The non-transitory storage media of claim 23, wherein the second section of the buffer further comprises lines that must have been updated during a last reading cycle of the buffer.

* * * * *